United States Patent [19]

Arai et al.

[11] Patent Number: 5,000,625
[45] Date of Patent: Mar. 19, 1991

[54] INSERTED CUTTING TOOL

[75] Inventors: Tatsuo Arai, Kitamoto; Takayoshi Saito, Tokyo, both of Japan

[73] Assignee: Mitsubishi Kinzoku Kabushiki Kaisha, Tokyo, Japan

[21] Appl. No.: 217,884

[22] Filed: Jul. 11, 1988

[30] Foreign Application Priority Data

Jul. 11, 1987 [JP] Japan .................... 62-106810[U]

[51] Int. Cl.$^5$ ............................ B26D 1/12
[52] U.S. Cl. ...................... 407/41; 407/42; 407/34
[58] Field of Search ............... 407/41, 42, 34

[56] References Cited

U.S. PATENT DOCUMENTS

| 3,138,847 | 6/1964 | Berry. |  |
| 3,217,384 | 11/1965 | Wirfelt. |  |
| 3,535,759 | 8/1970 | Mueller | 407/41 |
| 3,634,918 | 1/1972 | Waisanen | 407/41 |
| 3,955,259 | 5/1976 | Gustafsson. |  |
| 4,687,383 | 8/1987 | Shimomura et al.. |  |

FOREIGN PATENT DOCUMENTS

| 1907629 | 9/1970 | Fed. Rep. of Germany. |  |
| 2806079 | 3/1979 | Fed. Rep. of Germany. |  |
| 3007322 | 9/1981 | Fed. Rep. of Germany | 407/41 |

Primary Examiner—Frederick R. Schmidt
Assistant Examiner—Lawrence Cruz
Attorney, Agent, or Firm—Cushman, Darby & Cushman

[57] ABSTRACT

An inserted cutting tool includes a tool body, a plurality of cutting inserts, a plurality of wedge members and a plurality of clamp screws. The body includes a plurality of pockets formed therein, and each pocket includes a recess for receiving the insert. Each wedge member has a hole formed therethrough and has a first abutment surface disposed in abutment with a front face of the insert and at least one second abutment surface disposed in abutment with the body. Each clamp screw passes through the hole of a respective one of the wedge members and threaded into the body so that the tightening of the clamp screw causes the wedge member to wedge the insert against the body. The first abutment surface of each wedge member is inclined with respect to an axis of the hole in such a manner that a wedge angle defined therebetween ranges from about 30° to about 50°. The wedge member is so disposed that the clamp screw extends radially inwardly of the body in a direction opposite to the direction of rotation of the body. Each clamp screw is displaced from a respective one of the inserts axially rearwardly of the body to thereby allow the insert and the clamp screw to be in an interference-free location.

12 Claims, 3 Drawing Sheets

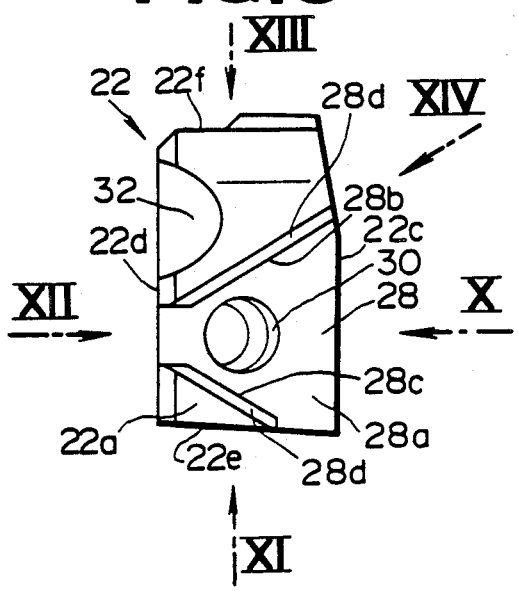
FIG. 9
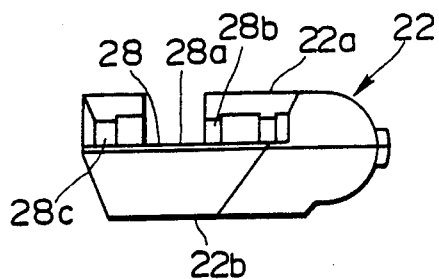
FIG. 10
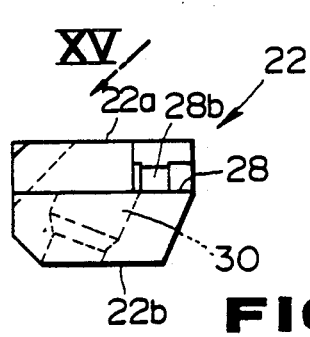
FIG. 11
FIG. 12
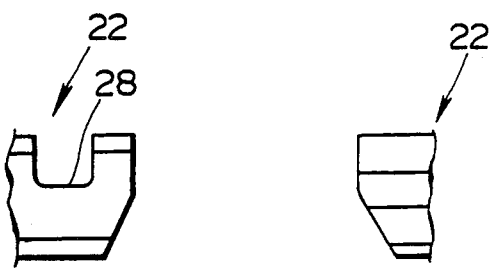
FIG. 13
FIG. 14
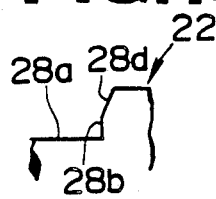
FIG. 15
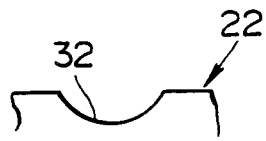
FIG. 16
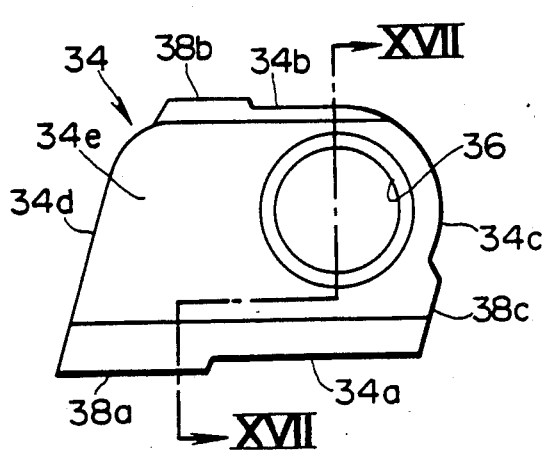
FIG. 17
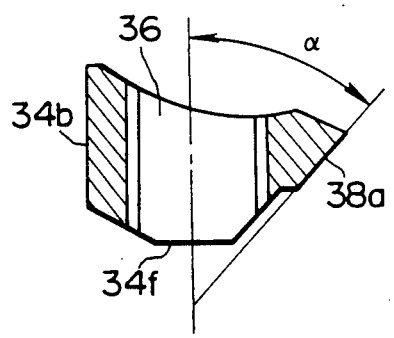

INSERTED CUTTING TOOL

BACKGROUND OF THE INVENTION

1. Field of the Invention

The present invention relates to an inserted cutting tool having a plurality of indexable cutting inserts releasably attached to a tool body through respective wedge blocks.

2. Prior Art

FIGS. 1 and 2 of the accompanying drawings show one conventional cutting tool 100 which comprises a tool body 102 having a central mounting bore 104 formed coaxial therewith and extending therethrough and a plurality of indexable cutting inserts 106 releasably attached to an outer periphery of the tool body 102 by means of respective clamp screws 108. Each clamp screw 108 has a disk-shaped head 108a and is threaded into the tool body 102 with the lower face of the head 108a held in abutting engagement with the front face of a respective one of the inserts 106 to thereby hold the insert 106 against movement.

In the cutting tool 100, however, a large space is required for the threading and unthreading of the clamp screw 108, and hence it has been practically possible to attach an increased number of the cutting inserts 106 to the body 102. Besides, there may be produced a gap between the front face of the insert 106 and the head 108a of the screw 108, and chips produced during the cutting operation may be jammed in the gap.

Another conventional inserted cutting tool 100a shown in FIG. 3 comprises a plurality of support members 110 fixedly secured to an outer periphery of a tool body 102a, a plurality of cutting inserts 106a each received in a respective one of the support members 110, and a plurality of wedge blocks 112 for holding the inserts 106a against the support members 110, respectively, each wedge block 112 being fixedly secured to the body 102a by a respective clamp screw 114 threaded thereinto. The clamp screw 114 is so disposed as to extend radially inwardly and axially rearwardly of the body 102a, whereby a prescribed wedge angle defined by the axis of the clamp screw 114 and the front face of the insert 106a is imparted to the wedge 112. With this construction, the clamp screw 114 is tightened to cause the wedge block 112 to wedge the insert 106a against the body 102a.

In the cutting tool 100a, however, a threaded hole 116 into which the clamp screw 114 is threaded has to be made shorter so as not to interfere with the central bore 104. As a result, a longer clamp screw cannot be employed, and hence the clamping force of the insert has been insufficient. Besides, insomuch as the threaded hole 116 extends axially rearwardly of the body 102a, the torsional rigidity of the body 102a has been unduly low.

SUMMARY OF THE INVENTION

It is therefore an object of the present invention to provide an inserted cutting tool in which a greater number of cutting inserts can be mounted and in which the cutting inserts can be firmly secured to a tool body without reducing the torsional rigidity of the body.

According to the present invention, there is provided an inserted cutting tool comprising:

(a) a tool body of a generally circular cross-section having an axis of rotation therethrough and having a forward end face and a circumferential surface, the body including a plurality of pockets formed therein in circumferentially distributed relation and opening t both the circumferential surface and the forward end face, each of the pockets including a recess facing in a direction of rotation of the body and opening to both the circumferential surface and the forward end face;

(b) a plurality of cutting inserts each including a front face having at least one marginal ridge with the marginal ridge serving as a respective main cutting edge, the front face having a marginal portion disposed adjacent and extending along the main cutting edge, the marginal portion serving as a rake surface for the main cutting edge, each insert being received in the recess of a respective one of the pockets with the front face directed generally in the direction of rotation of the body, in such a manner that the main cutting edge is indexed in a working position;

(c) a plurality of wedge members each fixedly secured to the body, each wedge member having a hole formed therethrough and having a first abutment surface disposed in abutment with the front face of the insert and at least one second abutment surface disposed in abutment with the body; and (d) a plurality of clamp screws for releasably securing the wedge members to the body, respectively, each clamp screw passing through the hole of a respective one of the wedge members and threaded into the body so that the tightening of the clamp screw causes the wedge member to wedge the insert against the body;

the first abutment surface of each wedge member being inclined with respect to an axis of the hole in such a manner that a wedge angle defined therebetween ranges from about 30° to about 50°, the wedge member being so disposed that the clamp screw extends radially inwardly of the body in a direction opposite to the direction of rotation of the body, each clamp screw being displaced from a respective one of the inserts axially rearwardly of the body to thereby allow the insert and the clamp screw to be in an interference-free location.

BRIEF DESCRIPTION OF THE DRAWINGS

FIG. 9 is a plan view of a support member attached to the tool of FIG. 4;

FIG. 10 is a view of the support member of FIG. 9 as seen in the direction indicated by the arrow X in FIG. 9;

FIG. 11 is a view of the support member of FIG. 9 as seen in the direction indicated by the arrow XI in FIG. 9;

FIG. 12 is a partially cut-away view of the support member of FIG. 9 as seen in the direction indicated by the arrow XII in FIG. 9;

FIG. 13 is a partially cut-away view of the support member of FIG. 9 as seen in the direction indicated by the arrow XIII in FIG. 9;

FIG. 14 is a view of the support member of FIG. 9 as seen in the direction indicated by the arrow XIV in FIG. 9;

FIG. 15 is a view of the support member of FIG. 9 as seen in the direction indicated by the arrow XV in FIG. 11;

FIG. 16 is a plan view of a wedge member attached to the tool of FIG. 4; and

FIG. 17 is a cross-sectional view of the wedge member of FIG. 16 as seen in the direction indicated by the arrow XVII—XVII in FIG. 16.

DESCRIPTION OF THE PREFERRED EMBODIMENTS OF THE INVENTION

Figure 1:
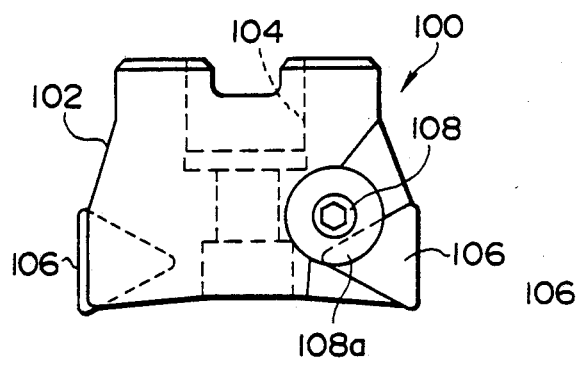
FIG. 1 is a front elevation of a conventional inserted cutting tool.
Figure 2:
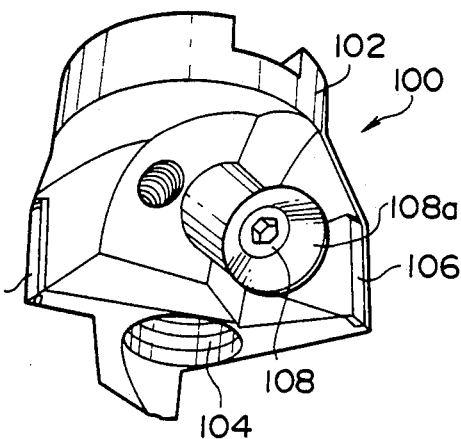
FIG. 2 is a perspective view of the tool of FIG. 1.
Figure 3:
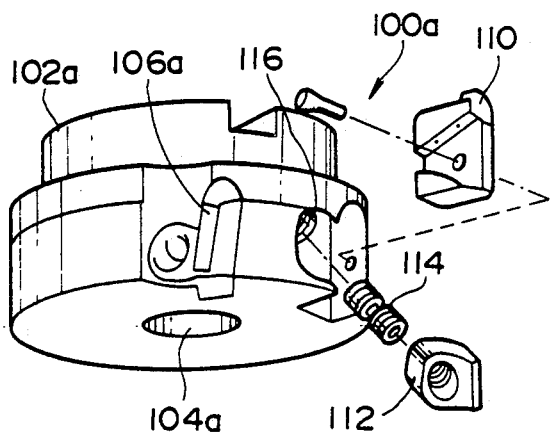
FIG. 3 is an exploded perspective view of another conventional inserted cutting tool.
Figure 4:
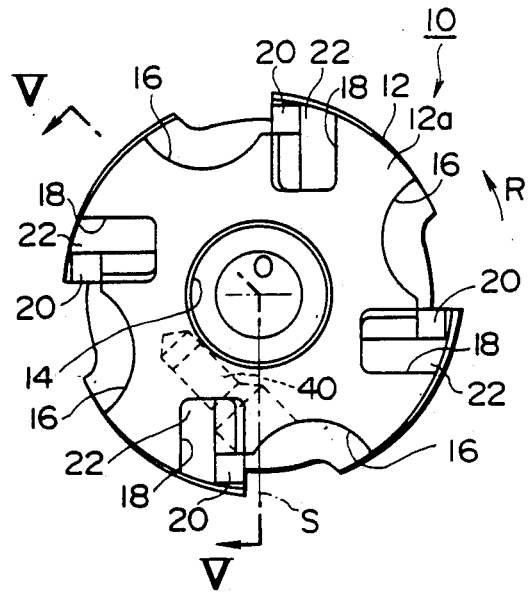
FIG. 4 is an end view of an inserted cutting tool in accordance the present invention.

Referring to FIGS. 4 to 17, there is illustrated an inserted cutting tool 10 in accordance with the present invention which comprises a tool body 12 of a circular cross-section having a forward end face 12a, a rearward end face 12b and a circumferential surface 12c lying between the forward and rearward end faces 12a and 12b. The tool body 12 has a central mounting bore 14 formed coaxially therewith and extending therethrough, and the rearward end portion of the tool body 12 is adapted to be fixedly secured to a conventional machine spindle so that the body 12 can be rotated in the direction of the arrow R about an axis 0 therethrough.

Figure 6:
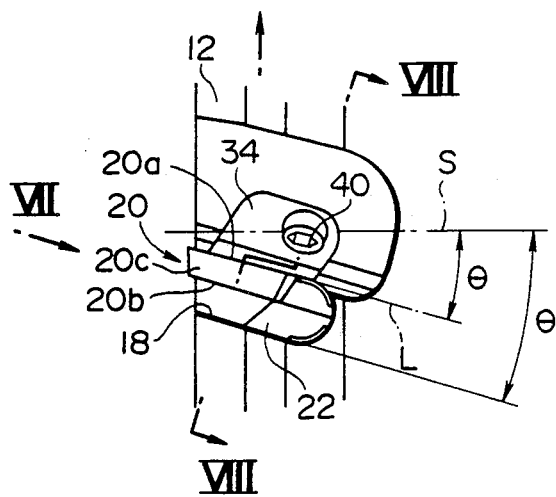
FIG. 6 is a side elevation of a part of the tool of FIG. 4 as seen in the direction indicated by the arrow VI in FIG. 4.

The tool body 12 has a plurality of forwardly-opening pockets 16 formed in the circumferential surface 12c in circumferentially equally spaced relation to each other and disposed adjacent to the forward end face 12a. Each pocket 16 is provided with a recess 18 of a generally quadrilateral shape which faces in the direction of rotation of the body 12 and opens to both the forward end face 12a and the circumferential surface 12c. The recess 18 has a planar bottom 18a sloping in a circumferential direction opposite to that of rotation of the body 12 away from the forward end face 12a and a planar side wall face 18b disposed generally perpendicularly to the bottom 18a adjacent thereto and facing generally radially outwardly of the body 12. As best shown in FIG. 6, the bottom 18a of the recess 18 is inclined with respect to a plane S containing the axis 0 thereon at a prescribed angle as at $\theta$. Each recess 18 receives an indexable cutting insert 20 through a support member 22 interposed therebetween.

Although not shown in detail, the cutting insert 20 comprises a generally triangular plate of a uniform thickness defined by a flat front face 20a, a flat rear face 20b disposed parallel to the front face 20a, and three side faces 20c joining the front and rear faces 20a and 20b. Each of the side faces 20c is sloping inwardly in a direction away from the front face 20a. Three corners of the insert 20 are removed to provide three corner faces each of which is sloping inwardly in a direction away from the front face 20a. The insert 20 has three main cutting edges 24 each defined by the front face 20a and a respective one of the side faces 20c, and three auxiliary cutting edges 26 each defined by the front face 20a and a respective one of the corner faces. Each side face 20b serves as a relief surface for a respective one of the main cutting edges 24, and each corner face also serves as a relief surface for a respective one of the auxiliary cutting edges 26. Those marginal portions of the front face 20a extending along and disposed adjacent the main and auxiliary cutting edges 24 and 26 serve as rake surfaces for the cutting edges, respectively.

Figure 5:
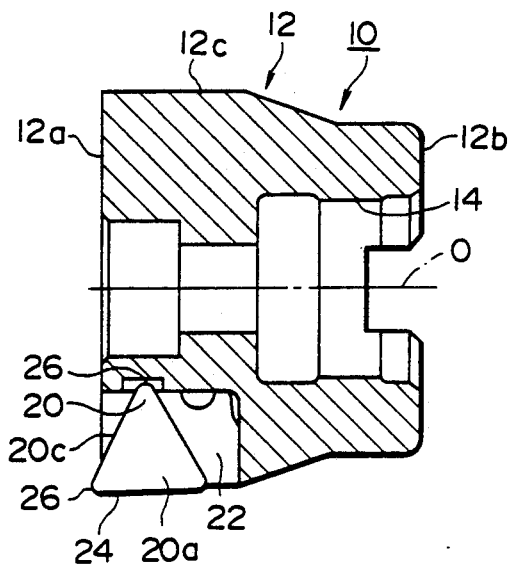
FIG. 5 is a cross-sectional view as seen in the direction indicated by the line V—V in FIG. 4.

The support member 22 has a generally hexahedral shape, as best shown in FIG. 9, defined by a pair of parallel front and rear surfaces 22a and 22b, a pair of opposite first and second longer side surfaces 22c and 22d and a pair of opposite third and fourth shorter side surfaces 22e and 22f. The member 22 includes an insert receiving recess 28 or a second recess formed in the front surface 22a and defined by a bottom surface 28a and a pair of opposed first and second side walls 28b and 28c, the bottom surface 28a being disposed generally parallel to the front and rear surfaces 22a and 22b. The first and second walls 28b and 28c are disposed perpendicularly to the bottom surface 28a and extend so as to converge from the first side surface 22c toward the second side surface 22d to shape the bottom surface 28a into a generally triangular shape. Those corner portions defined by the front surface 22a and the first and second side walls 28b and 28c are chamfered to provide respectively positioning surfaces 28d which are sloping at the same angle as the relief angles of the main cutting edges of the insert 20 with respect to the first and second side walls 28b and 28c. An aperture 30 is formed through the support member 22 in such a manner that it opens to the bottom surface 28a of the recess 28 and to the rear surface 22b. Further, a notch 32 of an arcuate cross section is formed in the corner of the support member 22 into which the front surface 22a and the side surface 22d merge. The notch 32 is disposed adjacent the fourth side face 22f. Each support member 22 is received in a respective one of the recesses 18 with the rear surface 22b mated with the bottom 18a and with the second side face 22c mated with the side wall 18b, and is fixedly secured thereto by means of a mounting screw (not shown) threaded through the aperture 30 into the bottom 18a of the recess 18. Each cutting insert 20 is positioned in the insert recess 28 of a respective one of the support members 22 in such a manner that the rear face 20b and the two adjacent side faces 20c of the insert 20 are held in contact with the bottom 18a of the recess 18 and the positioning surfaces 28d of the first and second side walls 28b and 28c, respectively. In this condition, the insert 20 received in the support member 22 is firmly retained therein by means of a wedge member or block 34 fixedly secured to the body 12. As best shown in FIG. 5, the disposition of each insert 20 is such that one of the main cutting edges 24 is indexed in a peripheral cutting position and that the front face 20a faces in the direction of rotation of the body 12.

As shown in FIGS. 16 and 17, the wedge block 34 is of a generally quadrilateral shape as viewed in plan and hence includes a pair of opposite first and second side faces 34a and 34b and a pair of opposite third and fourth side faces 34c and 34d. The wedge block 34 includes an interiorly threaded hole 36 formed therethrough and opening to front and rear faces 34e and 34f, the threaded hole 36 being disposed adjacent the third side face 34c. The second side face 34b is formed to be parallel to an axis of the threaded hole 36 while the first side face 34a is sloping inwardly in a direction away from the front face 34e in such a manner that an angle $\alpha$ defined by the first side face 34a and the second side face 34b serves as a wedge angle and that it is set to be 45°. The first side face 34a includes a planar stepped portion 38a which serves as an abutment surface for being held in abutting engagement with the front face 20a of the insert 20. Similarly, the second and third side face 34b and 34c respectively include planar stepped portions 38b and 38c which serve as first and second abutment surfaces for being held in abutting engagement with the body 12, respectively. Each abutment surface is parallel to the remaining portion of the side face and is projecting therefrom, the abutment surfaces 38a and 38b being disposed adjacent the fourth side face 34d while the abutment surface 38c is disposed adjacent the first side face 34a.

Figure 7:
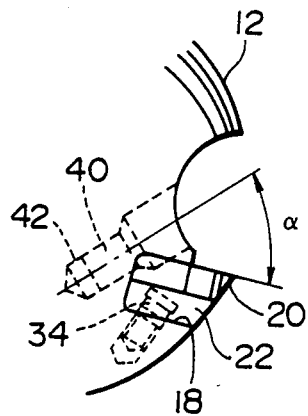
FIG. 7 is a view as seen in the direction indicated by the arrow VII in FIG. 6.
Figure 8:
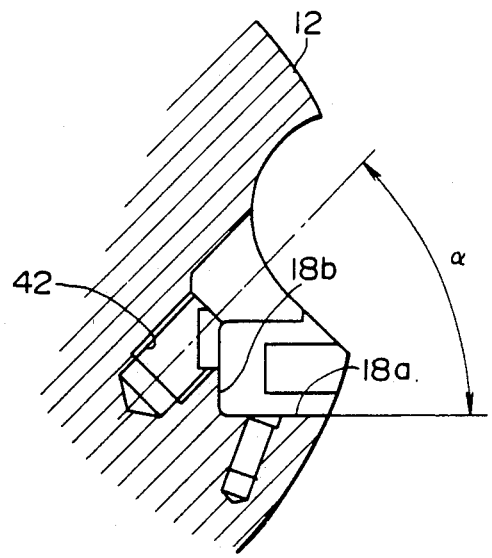
FIG. 8 is a cross-sectional view as seen in the direction indicated by the arrow VIII—VIII in FIG. 6.

The wedge block 34 is nestingly accommodated in a recessed portion of the pocket 16 with the abutment surface 38a held in abutting engagement with the front face 20a of the insert 20 and with the abutment surfaces 38b and 38c held in abutting engagement with the the walls of the recessed portion, and secured thereto by a clamp screw 40 threaded through the threaded hole 36 of the wedge block 34 into a threaded bore 42 of the tool body 12. The threaded hole 42 is, as shown in FIGS. 7 and 8, formed at a position spaced rearwardly from the insert so as to intersect with the wall 18b of the recess 18. The axis of the threaded hole 42 is disposed on a plane perpendicular to a reference line, as at L, which is contained in the front face 20a and is inclined at an angle as of $\theta$ with respect to the plane S, and is inclined at an angle $\alpha$ as of 45° with respect to the bottom 18a of the recess 18, so that the threaded hole is well spaced from the central bore 14 of the body 12a. The clamp screw 40 comprises forward and rearward portions exteriorly threaded in opposite directions and connected together through an intermediate connecting part, and the forward threaded portion is threaded in the bore 42 while the rearward threaded portion is threaded in the hole 36 of the wedge block 34. With this construction, the tightening of the clamp crew 40 not only causes the screw itself to move in a tightening direction but also forces the wedge block 34 into wedging position. Further, as shown in FIGS. 7 and 8, the wedge member 34 is so disposed that the clamp screw 40 extends radially inwardly of the body 12 in the direction opposite to the direction of rotation of the body 12. Each clamp screw 40 is displaced from a respective one of the inserts 20 axially rearwardly of the body 12, so that the insert 20 and the clamp screw 40 are in an interference-free location to each other. In addition, the abutment surface 38b faces generally in the direction of rotation of the body 12 while the abutment surfaces 38c faces generally axially rearwardly of the body 12, and the recessed portion of the pocket includes flat surfaces with which these abutment surfaces are mated.

For releasably securing the insert 20 to the body 12, the support member 22 is first received in and fixedly secured to the recess 18 of the body 12. Then, the insert 20 is received in the insert recess 28 of the support member 22 with the two adjacent side faces 20c of the insert 20 mated with the positioning surfaces 28d of the two opposed wall surfaces 28b and 28c. Subsequently, the clamp screw 40 on the rearward threaded portion of which the wedge block 34 is threaded is threaded into the threaded bore 42 of the body 12. As the clamp screw 40 is tightened, the wedge block 34 is caused to move in the same direction, and hence the wedge block 34 is brought into firm engagement with the body 12 and the insert 20 with the abutment surface 38a held in abutting engagement with the front face 18a of the insert 20 and with the abutment surfaces 38b and 38c held in abutting engagement with the body 12. The tightening force produced by the wedge block 34 is increased due to the wedge angle imparted thereto, and the insert 20 can be firmly held against movement. For detecting the insert 20, the clamp screw 40 is unthreaded.

In the cutting tool as described above, the wedge block 34 is provided with a wedge angle of 45°, and hence the clamp screw 40 can be arranged so as to extend radially inwardly of the body 12 in the direction opposite to the direction of rotation of the body 12. As a result, the threaded hole 42 can be made greater in length without interfering with the central bore 14 of the body 12, and a clamp screw of a greater length can be employed, to thereby enabling the inserts 20 to be secured to the body 12 with an increased strength. Further, inasmuch as the clamp screw 40 extends not axially rearwardly of the body 12, the torsional rigidity of the body 12 can be improved substantially. In addition, the wedge block 34 includes the three abutment surfaces 38a, 38b and 38c for being held in abutment with the insert 20 and the body 12. Accordingly, the wedge block 34 is less susceptible to shifting during the cutting operation, so that the reduction in the clamping force of the wedge block is positively prevented. Besides, the wedge block 34 can be disposed in place with a higher precision.

While the inserted cutting tool according to the present invention has been specifically shown and described herein, the invention itself is not to be restricted by the exact showing of the drawings or the description thereof. For example, although in the above embodiment, the tool body 12 is provided with a central bore 14, the invention is also applicable to a cutting tool of the type having no such central bore. In the cutting tool of such type, the arrangement of the clamp screw as described in the previous embodiment is effective since the threaded bore can be made longer sufficiently without being interfered with the threaded bore disposed in diametrically opposite relation thereto. Further, although the wedge angle $\alpha$ of the wedge block 34 is preferably set to be 45° in the above embodiment, it may be changed. However, it should be within the range of between about 30° and about 50°. If the wedge angle is below about 30°, the interference of the clamp screw 40 with the central bore 14 cannot be obviated sufficiently. On the other hand, if the wedge angle $\alpha$ exceeds about 50°, a large pocket is required for the mounting of the wedge block 34. Hence, it has been hardly possible to attach an increased number of the inserts to the body 12. As regards the angle $\theta$, it is preferable that it ranges from about $-7°$ to about 20°. Further, the present invention is suitably applicable to a cutting tool in which the tool body 12 has an outer diameter ranging from about 40 mm to about 100 mm, and in which the number of the inserts 20 is from 3 to no greater than 8. Such tool usually includes the central bore 14 of a diameter ranging from about 16 mm to about 32 mm.

What is claimed is:
1. An inserted cutting tool comprising:
   (a) a tool body of a general circular cross-section having an axis of rotation therethrough and having a forward end face and a circumferential surface, said body including a fixing through-hole coaxial with the axis of rotation and a plurality of pockets formed therein in circumferentially distributed relation and opening to both said circumferential surface and said forward end face, each of said pockets including a recess facing in a direction of rotation of said body and opening to both said circumferential surface and said forward end face;

(b) a plurality of cutting inserts each including a front face having at least one marginal ridge with said marginal ridge serving as a respective main cutting edge, said front face having a marginal portion disposed adjacent and extending along said main cutting edge, said marginal portion serving as a rake surface for said main cutting edge, each insert being received in said recess of a respective one of said pockets with said front face directed generally in the direction of rotation of said body, in such a manner that said main cutting edge is indexed in a working position, said front face being inclined in the direction of rotation of said body at an angle $\theta$ with respect to a plane including said axis so as to have a desired axial rake angle;

(c) a plurality of wedge members each fixedly secured to said body, each wedge member having a hole formed therethrough and having a first abutment surface disposed in abutment with said front face of said insert and second and third abutment surfaces each disposed in abutment with said body; and (d) a plurality of clamp screws for releasably securing said wedge members to said body, respectively, each clamp screw passing through said hole of a respective one of said wedge members and treaded into said body so that the tightening of said clamp screw causes said wedge member to wedge said insert against said body;

said first abutment surface of each wedge member being inclined with respect to an axis of said hole in such a manner that a wedge angle defined therebetween ranges from 30° to 50° when viewed along a line inclined in the direction of rotation of said body at said angle $\theta$ with respect to said plane including said axis whereby, said wedge member being disposed so that said clamp screw extends radially inwardly of said body in a direction opposite to the direction of rotation of said body;

each clamp screw being displaced from a respective one of said inserts axially rearwardly of said body to thereby allow said insert and said clamp screw, and said clamp screw and said fixing through-hole to be in an interference-free location; and said threaded hole of said wedge member is displaced from said first abutment surface axially rearwardly of said body.

2. An inserted cutting tool according to claim 1, in which said tool body has an outer diameter ranging from about 40 mm to about 100 mm, and in which the number of said inserts is between 3 and 8 inclusive.

3. An inserted cutting tool according to claim 1, wherein said fixing through-hole has a diameter in the range from about 16 mm to about 32 mm.

4. An inserted cutting tool according to claim 1, in which said wedge angle is about 45°.

5. An inserted cutting tool according to claim 1, in which said angle $\theta$ is in the range from approximately $-7°$ to approximately 20°.

6. An inserted cutting tool according to claim 1, in which said second abutment surface faces generally in the direction of rotation of said body, while the said third abutment surface faces generally axially rearwardly of said body.

7. An inserted cutting tool according to claim 6, in which said second abutment surface is disposed in opposite relation to said first abutment surface and in parallel to said axis of said hole.

8. An inserted cutting tool according to claim 7, in which said clamp screw is disposed on a plane perpendicular to said rake surface of said insert.

9. An inserted cutting tool according to claim 7, in which said hole of said wedge member is so threaded that said clamp screw threadably engages said hole, said wedge member and said clamp screw being so formed that the tightening of said screw causes said wedge member to be forced in a wedging position.

10. An inserted cutting tool according to claim 9, further comprising a plurality of support members each interposed between a respective one of said inserts and said body, each support member comprising a plate having front and rear surfaces and having a second recess formed in said front surface thereof for receiving said insert therein.

11. An inserted cutting tool according to claim 10, in which said support member includes a notch formed therein for preventing said clamp screw from interfering with said support member.

12. An inserted cutting tool according to claim 11, in which said insert comprises a plate of a generally triangular shape defined by said front face, a rear face and three side faces.

* * * * *